United States Patent [19]

Garcia-Mallol

[11] Patent Number: 5,174,799
[45] Date of Patent: Dec. 29, 1992

[54] HORIZONTAL CYCLONE SEPARATOR FOR A FLUIDIZED BED REACTOR

[75] Inventor: Juan A. Garcia-Mallol, Morristown, N.J.

[73] Assignee: Foster Wheeler Energy Corporation, Clinton, N.J.

[21] Appl. No.: 505,806

[22] Filed: Apr. 6, 1990

[51] Int. Cl.⁵ .................................................. B01D 45/12
[52] U.S. Cl. ......................................... 55/269; 55/459.1; 55/459.3
[58] Field of Search .............. 55/459.1, 459.3, 267–269

[56] References Cited

U.S. PATENT DOCUMENTS

| | | | |
|---|---|---|---|
| 474,490 | 5/1892 | Walter | 209/144 |
| 928,673 | 7/1909 | Lebrasseur | 55/459.3 |
| 2,339,416 | 2/1941 | McDonald | 55/345 |
| 2,973,094 | 9/1958 | Lundy | 209/144 |
| 4,664,887 | 5/1987 | Engstrom | 422/147 |
| 4,672,918 | 6/1987 | Engstrom et al. | 122/4 D |
| 4,699,068 | 10/1987 | Engstrom | 110/216 |
| 4,708,092 | 11/1987 | Engstrom | 122/4 D |
| 4,713,098 | 12/1987 | Idvorian et al. | 55/345 |
| 4,731,228 | 3/1988 | Dewitz et al. | 55/459.1 |
| 4,732,113 | 3/1988 | Engstrom | 122/4 D |
| 4,746,337 | 3/1988 | Magol et al. | 55/269 |
| 4,755,134 | 7/1988 | Engstrom et al. | 431/170 |
| 4,880,450 | 11/1989 | Magol et al. | 55/269 |
| 4,904,286 | 2/1990 | Magol et al. | 55/269 |

FOREIGN PATENT DOCUMENTS 587240 4/1947 United Kingdom.
2159726 12/1985 United Kingdom.

*Primary Examiner*—Bernard Nozick
*Attorney, Agent, or Firm*—Marvin A. Naigur

[57] ABSTRACT

A reactor in which a furnace section, a heat recovery section and a horizontal cyclone separator are formed in a vessel. A bed of solid particulate material including fuel is supported in the furnace section and air is introduced into the bed at a velocity sufficient to fluidize same and support the combustion or gasification of the fuel. A mixture of air, the gaseous products of combustion and the particles entrained by the air are directed to the vortex chamber of the cyclone separator through an inlet duct. The helical end of the vortex chamber forces the mixture to spirally circulate within the chamber, where the solid particles of the mixture are separated by centrifugal forces. A central tube extends partially within the vortex chamber and receives the cleaned gases from the low pressure center of the chamber. The portion of the tube behind the helical end of the vortex chamber opens directly into the heat recovery area for passing the clean gases thereto. A trough extends from the lower portion of the vortex chamber to the fuel bed for receiving the separated particles and returning them to the bed.

15 Claims, 2 Drawing Sheets

HORIZONTAL CYCLONE SEPARATOR FOR A FLUIDIZED BED REACTOR

FIELD OF THE INVENTION

This invention relates in general to a cyclone separator, and, more particularly, relates to a horizontal cyclone separator for separating solid particles from gases generated by the combustion of fuel in a fluidized bed reactor, or the like.

BACKGROUND OF THE INVENTION

Fluidized bed combustion reactors are well known. In these arrangements, air is passed through a bed of particulate material, including a fossil fuel such as coal and an adsorbent for the sulfur released as a result of combustion of the coal, to fluidize the bed and to promote the combustion of the fuel at a relatively low temperature. When the heat produced by the fluidized bed is utilized to convert water to steam, such as in a steam generator, the fluidized bed reactor offers an attractive combination of high heat release, high sulfur adsorption, low nitrogen oxides emissions and fuel flexibility.

The most typical fluidized bed reactor includes what is commonly referred to as a bubbling fluidized bed in which a bed of particulate material is supported by an air distribution plate, to which combustion-supporting air is introduced through a plurality of perforations in the plate, causing the material to expand and take on a suspended, or fluidized, state. In the event the reactor is in the form of a steam generator, the walls of the reactor are formed by a plurality of heat transfer tubes. The heat produced by combustion within the fluidized bed is transferred to a heat exchange medium, such as water, circulating through the tubes. The heat transfer tubes are usually connected to a natural water circulation circuitry, including a steam drum, for separating water from the steam thus formed which is routed to a turbine to generate electricity or to a steam user.

In an effort to extend the improvements in combustion efficiency, pollutant emissions control, and operation turn-down afforded by the bubbling bed, a fluidized bed reactor has been developed utilizing a fast fluidized bed. According to this technique, the fluidized bed density may be below that of a typical bubbling fluidized bed, with the air velocity equal to or greater than that of a bubbling bed. The formation of the low density fast fluidized bed is due to its small particle size and to a high solids throughput, which requires high solids recycle.

The high solids circulation required by the fast fluidized bed makes it insensitive to fuel heat release patterns, thus minimizing the variation of the temperature within the combustor or gasifier, and therefore decreasing the nitrogen oxides formation. Also, the high solids recycling improves the efficiency of the mechanical device used to separate the gas from the solids for solids recycle. The resulting increase in sulfur adsorbent and fuel residence times reduces the adsorbent and fuel consumption. Furthermore, the fast fluidized bed inherently has more turn-down than the bubbling fluidized bed.

However, the fast fluidized bed process is not without problems. For example, the particulate fuel and adsorbent material used in a fast fluidized bed process must be relatively fine therefore requiring further crushing and drying of the particulate material, which is expensive. Also, the bed height required for adequate adsorption of the sulfur will be greater than that in a conventional bubbling fluidized bed system, which further adds to the capital expense and operating costs.

A reactor of the type disclosed in U.S. Pat. No. 4,809,623 incorporates operating principles and advantages of both the bubbling fluidized bed and the fast fluidized bed. The "hybrid" reactor and method features the forming of a gas column above a fluidized bed which contains a mixture of air, the gaseous products of combustion from a fluidized bed and particulate material, a portion of which is coarse enough to continuously stay in bed, while the rest is fine enough to be entrained by the air and the gaseous products of combustion. The gas column is saturated with particulate material and the particulate material is separated from the mixture and a portion of the separated particulate material is passed to external equipment.

Bubbling fluidized bed and especially the fast or hybrid fluidized bed combustion reactors require relatively large cyclone separators for the separation of entrained solid particles from the combustion gases and for solids recycle. A typical cyclone separator includes a vertically oriented, cylindrical vortex chamber in which is disposed a central gas outlet pipe for carrying the separated gases upwardly, while the separated particles are returned to the bed through a funnel-shaped base of the separator via a standpipe. These so-called vertical cyclone separators are substantial in size and eliminate the possibility of a compact system design which can be modularized and easily transported and erected. For larger combustion systems, several vertical cyclone separators are often required to provide adequate particle separation, which compound the size problem and, in addition, usually require complicated gas duct arrangements with reduced operating efficiency.

Horizontal cyclone separators characterized by a horizontally-oriented vortex chamber have been constructed which eliminate many of the above mentioned problems. For example, horizontal cyclone separators may be readily configured within the upper portion of the reactor and integrated with the walls of the reactor. However, known horizontal cyclone separators have various shortcomings, particularly with regard to their circulation and gas discharge arrangements and require extended ducting for transfer of the gases to a heat recovery area, and are otherwise less efficient in their construction and/or operation.

SUMMARY OF THE INVENTION

It is therefore an object of the present invention to provide a fluidized bed reactor which is relatively compact in size, can be modularized and is relatively easy to erect.

It is a further object of the present invention to provide a fluidized bed reactor of the above type in which the bulk, weight and cost of the cyclone separator are much less than that of conventional separators.

It is a still further object of the present invention to provide a fluidized bed reactor of the above type in which a conventional cyclone separator is replaced with a horizontal cyclone separator.

It is a still further object of the present invention to provide a fluidized bed reactor of the above type in which the horizontal cyclone separator permits improved separation of particles and gas discharge.

It is a still further object of the present invention to provide a fluidized bed reactor of the above type which is utilized to generate steam.

Toward the fulfillment of these and other objects, the fluidized bed reactor of the present invention includes a furnace section and a heat recovery section formed in a vessel. A bed of solid particulate material including fuel is supported in the furnace section and air is introduced into the bed at a velocity sufficient to fluidize same and support the combustion or gasification of said fuel. A mixture of air, the gaseous products of said combustion, and the solid particles entrained by the air and the gaseous products of combustion is directed to a horizontal cyclone separator in the upper portion of the vessel.

The horizontal cyclone separator includes a vortex chamber having an inlet duct which extends the full length of the furnace section for receiving the mixture and separating the particles from the mixture by centrifugal action. A coaxially disposed tube extends partially into the chamber, and the end of the chamber supporting the tube includes a helical wall formed in the annular space between the outer surface of the tube and the walls forming the chamber. The helical wall directs the mixture spirally within the chamber whereby the clean gases are forced into the tube at the low pressure center of the chamber. An outlet duct is provided in the portion of the tube between the back of the helical wall and the vessel for directing the clean gases directly into the heat recovery section. The separated particles fall into a trough which extends between the furnace and heat recovery sections and is connected to a lower portion of the chamber and the furnace section for returning the particles back to the bed.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention when taken in conjunction with the accompanying drawing in which.

DESCRIPTION OF THE PREFERRED EMBODIMENT

Figure 1:
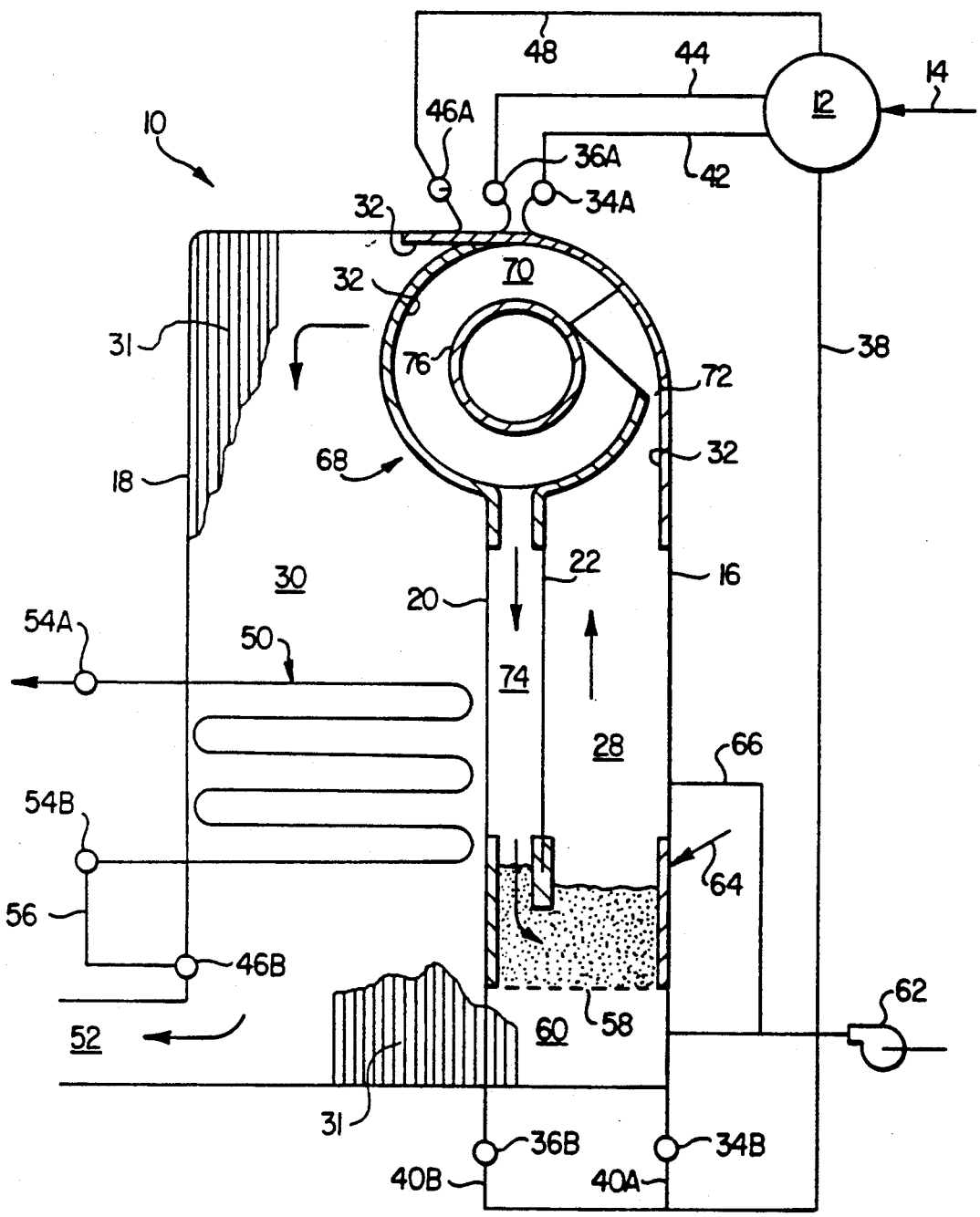
FIG. 1 is a schematic view partially in section, depicting the fluidized bed reactor of the present invention.
Figure 2:
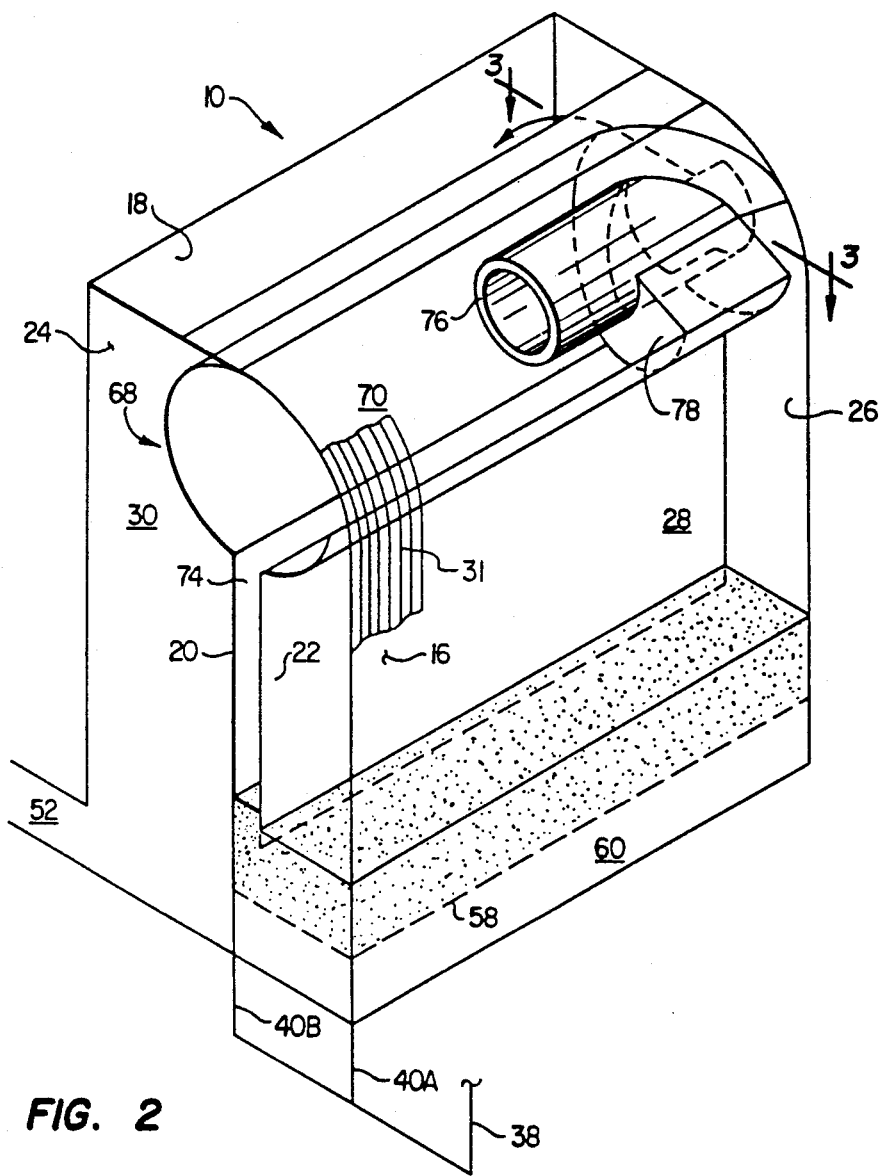
FIG. 2 is a perspective/schematic view of the fluidized bed reactor of FIG. 1 depicting the horizontal cyclone separator.

Referring to FIGS. 1 and 2 of the drawings, the reference numeral 10 refers to a fluidized bed reactor of the present invention forming a portion of a steam generating system including a steam drum 12 which receives water from a feed pipe 14 and is connected to the reactor by fluid flow circuitry, subsequently discussed.

The reactor 10 is disposed below the steam drum 12 and includes a vessel defined by a front wall 16, a spaced, parallel rear wall 18 and first and second intermediate partitions 20 and 22 extending between the walls 16 and 18 in a spaced, parallel relation thereto. First and second sidewalls 24 and 26 (FIG. 2), extend perpendicular to the front wall 16 and the rear wall 18 to form a substantially rectangular vessel. The upper portions of the walls 16 and 18 are curved and extend horizontally toward each other to provide a roof for the vessel. The wall 16 and the partition 22, along with corresponding positions of the sidewalls 24 and 26, form a furnace section 28. The wall 18 and the partition 20, along with corresponding positions of the sidewalls 24 and 26, form a heat recovery section 30. The upper ends of the walls 16, 18 and the partition 20 are slightly spaced relative to each other and bent for connection to the fluid flow circuitry, as will be described.

The walls 16, 18, the partition 20 and the sidewalls 24, 26 are each formed by a plurality of vertically-disposed tubes 31 interconnected by vertically disposed elongated bars, or fins, to form a contiguous, airtight structure. Since this type of structure is conventional, it will not be described in further detail.

The inner surfaces of the upper, curved portions of the walls 16, 18 and the partitions 20, 22 and also the lower portions of the wall 18 and the partitions, are lined with a refractory 32 or other suitable erosion-protection material. The refractory 32 extends across the spaces between the ends of the walls 16, 18 and the partition 20 for substantially enclosing the vessel.

Flow circuitry is provided to pass water, steam and/or a water steam mixture (hereinafter termed "fluid") through the tubes 31 to heat the fluid to the extent that it can be used to perform work such as, for example, driving a steam turbine (not shown). To this end, headers 34A, 34B are connected to the upper and lower ends, respectively, of the wall 16 and headers 36A, 36B are connected to the upper and lower ends, respectively, of the partition 20 for introducing fluid to, and receiving fluid from, the tubes 31 forming the respective walls. A downcomer 38 connects the steam drum 12 to the headers 34B and 36B by branch conduits 40A and 40B, respectively, for passing fluid from the drum to the headers. Conduits 42 and 44 connect the headers 34A and 36A, respectively, to the steam drum 12 for returning fluid from the headers to the drum.

Similarly, headers 46A, 46B are connected to the upper and lower ends, respectively, of the rear wall 18 for introducing fluid to, and receiving fluid from, the tubes 31 forming the latter wall. A conduit 48 connects the steam drum 12 to the header 46A, for passing fluid to the tubes 31 of the wall 18. The header 46B is connected to additional flow circuitry, described below.

A tube bank 50 is disposed in the heat recovery section 30 for removing heat from the heat recovery section in a manner to be described. A conduit 52 registers with an opening formed in a lower end portion of the wall 18 for discharging gases from the heat recovery section 30 in a manner to be described. Headers 54A and 54B are connected to the upper and lower ends, respectively, of the tube bank 50. A conduit 56 connects the header 46B of the wall 18 to the header 54B for passing fluid from the tubes 31 of the wall to the tube bank 50. Fluid exiting the tube bank 50 through the header 54A is passed to the steam drum 12 and/or to the steam turbine, or both, through additional flow circuitry (not shown).

Although not shown, flow circuitry similar to that described above is provided for the sidewalls 24, 26. It is also understood that the reactor 10 may be equipped with additional flow circuitry for improving the transfer of heat from the reactor 10. Other heat, reheat and superheat functions, also not shown, are contemplated. Since these techniques are conventional, they will not be discussed further.

A perforated air distribution plate 58 is suitably supported at a lower portion of the furnace section 28 and defines a plenum chamber 60. Air from a suitable source (not shown) is introduced into the plenum chamber 60 by conventional means, such as a forced-draft blower 62, or the like. The air introduced through the plenum chamber 60 passes in an upwardly direction to the air distribution plate 58 and may be preheated by air preheaters (not shown) and appropriately regulated by air control dampers (also not shown) as needed.

The air distribution plate 58 is adapted to support a bed of particulate fuel material consisting, in general, of crushed coal and limestone, or dolomite, for absorbing the sulfur formed during the combustion of the coal. A fuel distributor pipe (schematically represented by line 64 in FIG. 1) extends through the front wall 16 for introducing particulate fuel into the furnace section 28, it being understood that other pipes can be associated with the walls defining the furnace section for distributing particulate sorbent material and/or additional particulate fuel material into the furnace section as needed. It is understood that a drain pipe (not shown) registers with an opening in the air distribution plate 58 and extends through the plenum 60 for discharging spent fuel and sorbent material from the furnace section 28 to external equipment.

An air pipe represented by line 66 in FIG. 1, is connected to the blower 62 and extends through the front wall 16 at a predetermined elevation from the plate 58 to introduce secondary air into the furnace section 28, for reasons to be described. It is understood that a plurality of air ports (not shown) at one or more elevations can be provided through the wall 16 and any of the other walls defining the furnace section 28 for discharging the air from the line 66 into the furnace section.

A horizontal cyclone separator designated generally by the reference numeral 68 is provided in an upper portion of the vessel formed by the reactor 10. The separator 68 includes a horizontally disposed vortex chamber 70 for separating solid particles from a mixture of gases and particles, in a manner to be described. The vortex chamber 70 is generally cylindrical and defined by the upper, curved portions of the front wall 16, the partition 20 and the partition 22. The upper edge of the partition 22 is spaced laterally from the front wall 16 to define an inlet duct 72 extending the full length of the furnace section 28. The lower portion of the partition 22 is adjacent to, and parallel with, the partition 20 to define an outlet trough 74 extending from a lower portion of the vortex chamber 70 to an area just above the distribution plate 58. The trough 74 extends the full length of the furnace section 28 into the fuel bed on the plate 58.

A central tube 76 extends coaxially within a portion of the vortex chamber 70 for receiving clean gases from the vortex chamber and passing them to the heat recovery section 30, as will be described. The tube 76 extends from the side wall 26 and is sufficient in length to promote the circular flow of the mixture of gases and the particulate material in the chamber 70, yet also allows for efficient passage of the clean gases into an open end thereof. A helical wall 78 extends across the annular space between the surface of the tube 76 and the curved portions of the wall 16 and the partitions 20, 22 defining the vortex chamber 70. One end of the helical wall 78 is located at the side wall 26 and the helical wall spirally encircles the central tube 76 and terminates at the upper edge of the partition 22. The helical wall 78 forms a helical end of the vortex chamber 70 for supporting the tube 76 and also for directing the mixture received through the inlet duct 72 spirally within the chamber in the direction of the other end thereof, as will be subsequently described.

Figure 3:
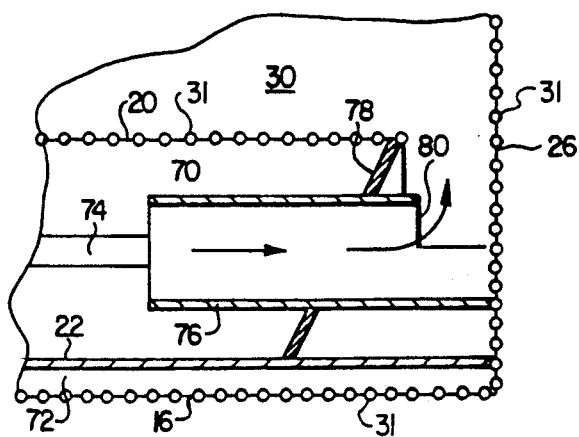
FIG. 3 is a partial enlarged sectional view of a portion of the reactor taken along line 3—3 of FIG. 2.

Referring also to FIG. 3, an outlet opening 80 is provided in the portion of the tube 76 outside the vortex chamber 70 and behind the helical wall 78. The outlet opening 80 is formed by removing a section of the wall of the tube 76, and opens directly into the heat recovery section 30 for passing the clean gases from the chamber 70 into the heat recovery section, as will be described.

In operation, a particulate material, including coal, is provided on the air distribution plate 58 and is ignited by a light-off burner (not shown), or the like, while air is introduced into the plenum chamber 60. Additional material is introduced through the distributor 64 into the interior of the furnace section 28 as needed. As the combustion of the coal progresses, additional air is introduced into the plenum chamber 60 in quantities that comprise a fraction of the total air required for complete combustion so that the combustion in the lower portion of the furnace section 28 is incomplete. The latter section thus operates under reducing conditions and the remaining air required for complete combustion is supplied by the air pipe 66. The range of air supplied through the plenum chamber 60 can be, for example, from 40%–90% of that required for complete combustion, while the remaining air (10%–60%) is supplied through the pipe 66.

The high-pressure, high velocity, combustion-supporting air introduced through the air distribution plate 58 from the plenum chamber 60 is at a velocity which is greater than the free-fall velocity of the relatively fine particles in the bed and less than the free-fall velocity of relatively course particles. Thus, a portion of the fine particles become entrained and pneumatically transported by air and the combustion gases. This mixture of entrained particles and gases rises upwardly within the furnace section 28 and passes through the inlet duct 72 along the entire length of the furnace section 28 into the vortex chamber 70 of the cyclone separator 68. The inlet duct 72 is arranged so that the mixture enters in a direction substantially tangential to the vortex chamber 70 and thus swirls around in the chamber. The entrained solid particles are thus propelled by centrifugal forces against the inner surfaces of the wall 16 and the partitions 20, 22 forming the vortex chamber 70, where they collect and fall downwardly by gravity into the trough 74. The partition 22 extends sufficiently into the fuel bed supported by the distribution plate 58 so that the particles can flow from the trough 74 into the bed as needed for recycle, while sealing against backflow of the high-pressure gases from the furnace section 28.

The mixture circulating in the vortex chamber 70 is directed by the helical wall 78 to flow in a spiral fashion toward one end of the chamber, i.e., in a direction towards the wall 24. The pressure changes created by the spiral flow force the relatively clean gases concentrating along the central axis of the chamber 70 toward the low pressure area created at the opening of the tube 76. The clean gases thus pass into the tube 76 and exit through the outlet opening 80 directly into the heat recovery section 30. Since the tube 76 rests against the sidewall 26, the gases leave through the outlet opening 80 generally perpendicular to the axis of the tube 76, which is also generally parallel to the direction of entry of the mixture into the separator 68 through the inlet duct 72.

Water is introduced into the steam drum 12 through the water feed pipe 14 and is conducted downwardly through the downcomer 38 into the lower headers 34B, 36B and the tubes 31 forming the wall 16 and partition 20, as described above. Heat from the fluidized bed, the gas column, and the transported solids converts a portion of the water into steam, and the mixture of water and steam rises in the tubes 31, collects in the upper headers 34A, 36A, and is transferred to the steam drum 12 through the conduits 42, 44. The steam and water are separated within the steam drum 12 in a conventional manner, and the separated steam is conducted from the steam drum through the conduit 48 and the header 40A to the tubes 31 forming the wall 18 of the heat recovery section 30. The steam is then passed from the lower header 46B by the conduit 56 to the header 54B and into the tube bank 50 for absorbing additional heat from the gases passing through the heat recovery section 30. The steam is thereafter passed through additional flow circuitry to the drum and/or to a steam turbine, or the like (not shown). The separated fluid is mixed with the fresh supply of water from the feed pipe 14 and is recirculated through the flow circuitry in the manner just described. Other cooling surfaces, preferably in the form of partition walls with essentially vertical tubes, can be utilized in the furnace section 28. For example, while not shown, the partition 22 may be provided with vertical tubes and connected to the flow circuitry.

The hot clean gases from the separator 68 enter the heat recovery section 30 through the outlet opening 80 and pass over the tube bank 50 to remove additional heat from the gases and add heat to the steam or water flowing through the latter tubes. The gases are then directed to the outlet conduit 52 and exit from the heat recovery section 30. If the air which is introduced into the plenum 60 is at a relatively high pressure on the order of 10 atmospheres, the gases from the outlet conduit 52 may be directed to a gas turbine, or the like (not shown).

It is thus seen that the reactor of the present invention provides several advantages. For example, the provision of the horizontal cyclone separator integrated in the upper portion of the vessel of the reactor 10, with the return trough 74 connected directly to the fuel bed of the furnace section 28, permits the separation of the entrained particles and the recycling of same back to the furnace section while eliminating the need for relatively bulky and expensive vertical cyclone separators. Thus, the reactor 10 of the present invention is relatively compact and can be fabricated into modules for easy transportation and fast erection which is especially advantageous when the reactor is used as a steam generator, as disclosed. Also the mixture enters the vortex chamber 70 generally tangentially through the inlet opening 68 extending along the entire length of the furnace section, without being significantly redirected by unnecessary baffles, tubes and/or ducting, and the vortex chamber 70 is configured for improved circulation and separation of the solid particles from the gases of the mixture generated in the furnace section 28.

Further, the central tube 76 promotes well-defined circulation in the chamber 70. The spiral circulation of the mixture caused by the helical wall 78 also improves the transfer of the clean gases into the opening of the tube 76 and thus into the heat recovery section 30. Additionally, since the tube 76 is confined within the vessel of the reactor 10 and the outlet opening 80 is provided just behind the end of the chamber 70 formed by the helical wall 78, the hot, clean gases are transferred directly and quickly into the heat recovery section without the need for additional piping and intricate duct arrangements.

Further, the temperature of the separator 68 is reduced considerably due to the relatively cool fluid passing through its walls to reduce heat losses from the separator and minimize the requirement for internal refractory insulation. The need for extended and expensive high temperature refractory-lined duct work and expansion joints between the reactor and cyclone separator, and between the latter and the heat recovery section is also minimized.

It is understood that variations in the foregoing can be made within the scope of the invention. For example, the walls of the vessel of the reactor 10 may be reconfigured to accommodate more than one horizontal cyclone separator in the upper portion thereof in communication with the furnace section. Also, while the headers and flow circuitry have been described and shown in the drawings, it should be understood that any other suitable header and flow circuitry arrangement could be employed in connection with the present invention.

A latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A cyclone separator comprising curved walls to define a generally cylindrical vortex chamber for separating particles from a mixture of gases and said particles by centrifugal forces, a helical wall forming an end of said chamber for causing said mixture to circulate spirally within said chamber away from said helical wall, an inlet means defined by said curved walls and extending the entire axial length of said chamber up to said helical wall for receiving said mixture into said chamber, an outlet means defined by said curved walls and extending along the length of said chamber for discharging said separated particles from said chamber, and a tube coaxially disposed within a portion of said chamber and extending through said helical wall for discharging said gases therefrom.

2. The cyclone separator according to claim 1 wherein said vortex chamber is horizontally disposed.

3. The cyclone separator according to claim 1 further comprising a plurality of tubes extending in a parallel relationship for at least a portion of their lengths over at least a portion of said curved walls, headers connected to the ends of said tubes, and means for circulating a cooling fluid through said headers and said tubes to cool said curved walls.

4. The apparatus according to claim 1 wherein at least a portion of said curved walls include a refractory material.

5. The apparatus according to claim 1 wherein said inlet means is defined by laterally spaced, longitudinal portions of said curved walls.

6. The apparatus according to claim 1 wherein said outlet means is a trough defined by lower, parallel portions of said curved walls.

7. The apparatus according to claim 1 wherein said tube extends less than approximately one half the length of said chamber from said end.

8. The apparatus according to claim 1 wherein said tube is linear and includes an opening in a side portion thereof outside said chamber.

9. A cyclone separator comprising curved walls to define a generally cylindrical, horizontally disposed vortex chamber for separating particles from a mixture of gases and said particles by centrifugal forces, a helical wall forming an end of said chamber for causing said mixture to circulate spirally within said chamber away from said helical wall, an inlet means defined by said curved walls and extending the entire axial length of said chamber up to said helical wall for receiving said mixture into said chamber, an outlet means defined by said curved walls and extending along the length of said chamber for discharging the separated particles, and a tube coaxially disposed within a portion of said chamber and extending through said helical wall for discharging the separated gases.

10. The cyclone separator according to claim 9 further comprising a plurality of tubes extending in a parallel relationship for at least a portion of their lengths over at least a portion of said curved walls, headers connected to the ends of said tubes, and means for circulating a cooling fluid through said headers and said tubes to cool said curved walls.

11. The apparatus according to claim 9 wherein at least a portion of said curved walls include a refractory material.

12. The apparatus according to claim 9 wherein said inlet means is defined by laterally spaced, longitudinal portions of said curved walls.

13. The apparatus according to claim 9 wherein said outlet means is a trough defined by lower, parallel portions of said curved walls.

14. The apparatus according to claim 9 wherein said tube extends less than approximately one half the length of said chamber from said end.

15. The apparatus according to claim 9 wherein said tube is linear and includes an opening in a side portion thereof outside said chamber.

* * * * *